Jan. 31, 1950
G. L. HERVERT
2,495,895
FLUID CIRCULATING DEVICE
Filed Oct. 31, 1945
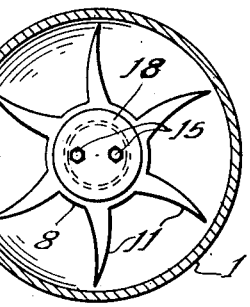
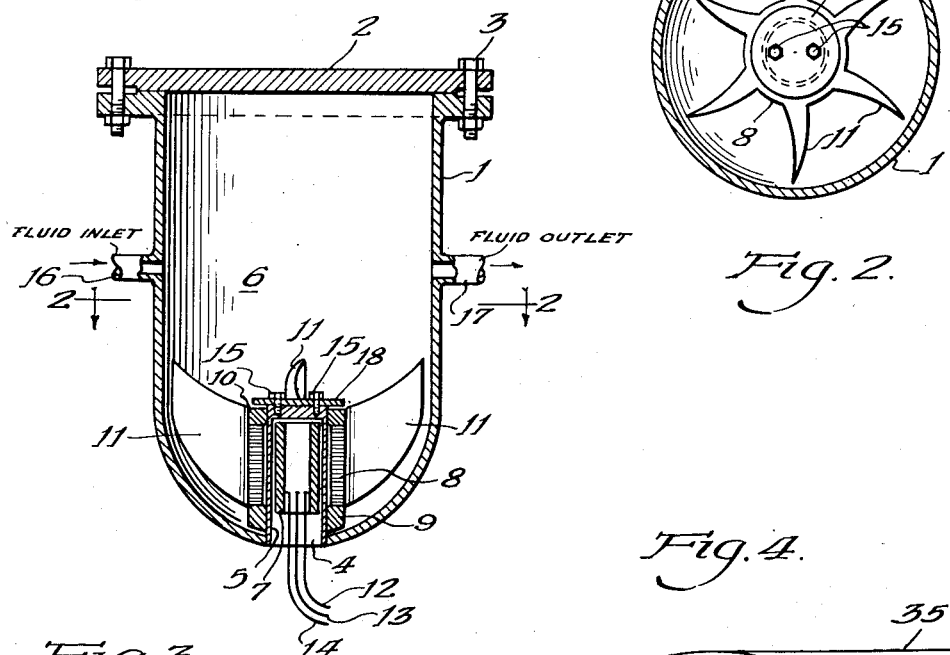
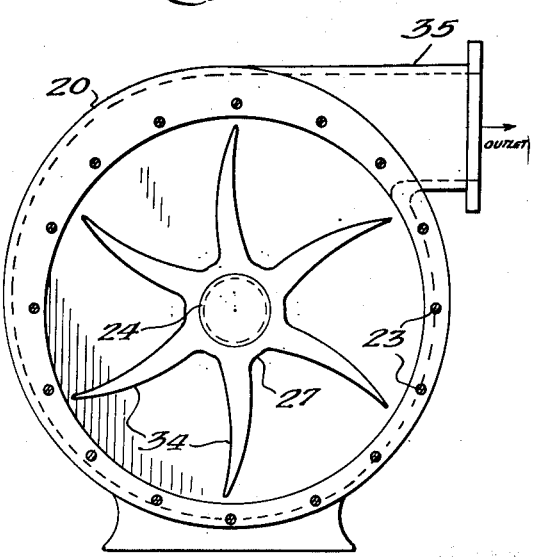
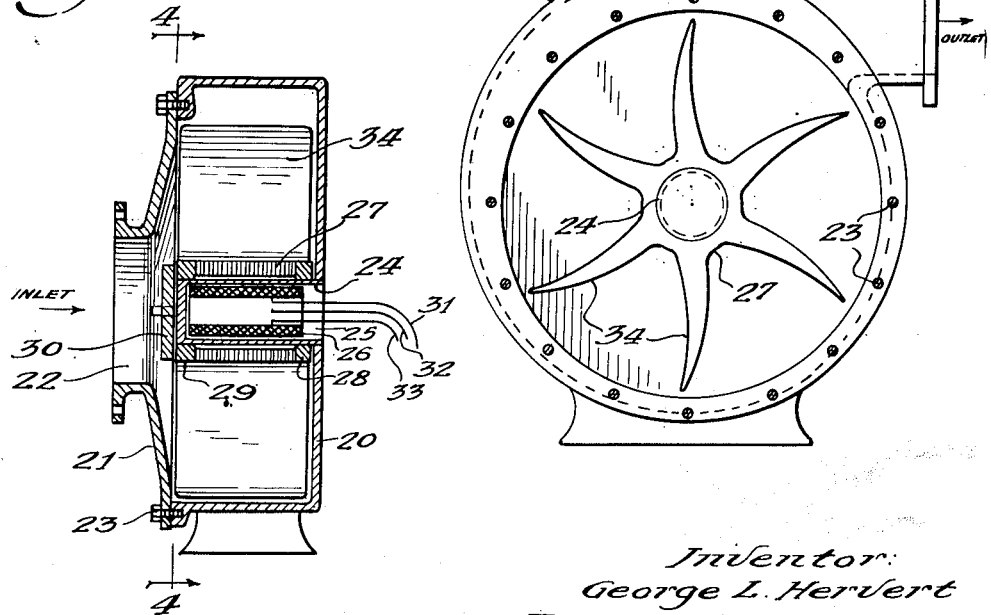
Inventor:
George L. Hervert
By: Maynard P. Venema
Attorney Patented Jan. 31, 1950

2,495,895

UNITED STATES PATENT OFFICE 2,495,895

FLUID CIRCULATING DEVICE

George L. Hervert, Berwyn, Ill., assignor to Universal Oil Products Company, Chicago, Ill., a corporation of Delaware Application October 31, 1945, Serial No. 625,852

4 Claims. (Cl. 259—108)

This invention relates to motor and impeller driven devices, such as mixers, stirrers, centrifuges, pumps and the like, wherein fluid materials are centrifugally moved or circulated.

In the present invention a ring-like rotor with radially extending blades is provided to rotate about an internally placed fixed stator or field coil. The stator is cylindrically shaped and adapted to fit into a tubular housing or projection provided within the particular fluid circulating chamber. The rotor is of ring-like shape and is adapted to fit around the tubular housing within the fluid circulating and pressure zone of the chamber, while the stator is encased within the tubular housing outside the pressure zone and separated from the rotor by the wall of the tubular housing.

The primary object of this invention is to provide apparatus of the type wherein circulatory mixing or pumping may be accomplished at subatmospheric or superatmospheric conditions without employing a rotating shaft, packing glands and the like, around the moving parts.

It is also an object of the invention to provide a novel form of rotor in connection with an induction motor whereby a plurality of impeller blades are a contiguous part of a revolving ring-like rotor adapted to rotate around an internally placed field coil.

The features of the invention are such that this improved type of apparatus is particularly useful in connection with corrosive fluid materials or for high pressure operating conditions where fluid seals or packed joints, are very troublesome. For instance, in connection with the process known as alkylation, where reactive saturated and unsaturated hydrocarbons are contacted with an acid catalyst, such as sulfuric acid or hydrogen fluoride in the liquid state, the reactants are thoroughly mixed in a mixing type of reactor chamber, such as may be provided by this invention. The mixing, pumping, or circulation of the corrosive materials may also be accomplished in another form of this invention, where a rotor and impeller blades are caused to revolve within a modified volute type of casing such as may be used with a centrifugal pump.

The basic improvement comprising this invention is in having a stator of an induction motor encircled by a tubular pressure tight housing of a suitable non-magnetic material such that a combination rotor and impeller placed within a fluid circulating chamber will rotate around the housing and the stator as a result of the electromagnetic forces issuing therefrom. Thus, the stator and rotor will be separated one from the other by the fluid and pressure tight tubular housing with the rotor being placed within the fluid chamber and the stator outside thereof. The tubular housing, around the stator or field coil, preferably is an internal tube-like projection from one wall of the fluid chamber, made in such a way, that the stator is accessible from the outside of the chamber. The tubular housing also may function as a stationary bearing or shaft for the rotor within the fluid circulating chamber.

One simplified form of mixing reactor may embody a cylindrical pressure tight chamber having a removable top head and a rounded bottom somewhat in the manner of a turbo-mixer. A centrally placed tubular member of non-magnetic material projecting inwardly from the bottom of the chamber provides a pressure tight housing for an induction motor stator, while an impeller-like rotor is positioned within the cylindrical pressure tight chamber, separated from the stator by the said pressure tight housing. The rotor of the motor may be laminated in the usual manner, but is constructed ring-like in shape having blades radiating outwardly therefrom, in order to form an impeller wheel, with the blades preferably constructed of a non-magnetic material. The electromagnetic forces from the field coil or stator when it is electrically charged, pass through the non-magnetic housing and cause the rotor to revolve around the stator and tubular housing, with the rotor being fitted to the housing much in the manner of a collar or bearing around a shaft.

Another simplified form of fluid circulating device provides a useful type of centrifugal pump. The improved form of centrifugal pump embodies a volute-shaped pressure tight pumping chamber for fluid circulation therethrough, having a tangential outlet and a side inlet. A tubular housing projecting centrally into the chamber forms a pocket for the stator of an induction type motor and also a pressure tight casing between this said stator and an impeller-like rotor within the pumping chamber. As in the manner of the previously mentioned embodiment, the rotor may be of a laminated construction and have a plurality of blades extending radially therefrom, to form an impeller wheel. The rotor is also fitted to the cylindrical wall of the tubular housing within the pumping chamber, so that it encompasses the stator and is capable of being electromagnetically rotated around the stator and tubular housing. The casing or tubular housing between the rotor and the stator is in all cases of a non-magnetic metal, alloy, plastic or the like and, of course, is constructed to withstand the internal hydrostatic pressure that is to be encountered within the fluid circulating chamber.

In pumps or mixers of this improved type a very considerable operating advantage is obtained by eliminating the usual rotating shaft between a motor and impeller blades, as the packing glands or fluid seals are eliminated. Even the latest improved types of packing and fluid seals are troublesome when high pressures or corrosive materials are encountered.

The features and construction of the fluid circulating devices comprising this invention will be more apparent upon reference to the accompanying drawing and the following description thereof.

Figure 1 of the drawing shows a sectional elevation view of one form of the fluid circulating device, suitable for centrifugally mixing fluid materials.

Figure 2 of the drawing shows a sectional plan view of the mixing device, as indicated by the line 2—2 in Figure 1.

Figure 3 of the drawing shows a sectional elevational view of another form of fluid circulating device which may be used as a centrifugal pump, or a mixer.

Figure 4 of the drawing shows another sectional elevational view of the second form of the device, as indicated by the line 4—4 in Figure 3.

Referring now to Figure 1 of the drawing; the cylindrical mixing chamber 1 is provided with a removable cover 2 which may be bolted to the chamber 1 by a plurality of bolts 3, in order to provide a closed pressure tight mixing chamber. A suitable fluid inlet 16 may be provided in the chamber wall 1 to admit reactants while a fluid outlet 17 provides means to withdraw mixed fluid materials. At the lower end of chamber 1, a pocket 4 is provided by a tubular housing 5 projecting internally into the mixing space 6. This tubular casing 5 is of a non-magnetic metal, alloy, or other material and is fixedly sealed to the lower end of chamber 1, or the materials and construction may be such that the tubular housing 5 is formed in a manner to be continuous with the chamber wall 1. A cylindrically shaped stator 7 of a three-phase induction motor is placed within the pocket 4 while, within the mixing space 6, around the tubular casing 5 a ring-like rotor 8 is positioned, such that it may rotate around the casing 5 and the stator 7. The rotor 8 may be of laminated construction as indicated in the drawing. At each end of the rotor, suitable bearing surfaces 9 and 10 are attached, in order to provide properly fitting and wearing surfaces for the tubular casing 5, in the manner of a collar or bearing for a shaft. A plurality of blades 11 extend radially from the ring-like rotor 8 and form an impeller which is suitable for mixing and circulating fluid materials within the chamber 1. The blades 11 are preferably of a non-magnetic material and may of course be tapered and slightly curved, as shown in the drawing, or they may be made straight, or any other desired shape. Wires 12, 13, and 14 leading to the stator 7 are provided to carry electrical energy to the stator or field coil 7 of the three-phase induction type motor. With electrical energy supplied to the stator 7 the rotor 8 with its blades 11 will be caused to rotate around the fixed tubular casing 5 because of the electromagnetic forces from the stator 7. The housing 5 should be made as thin as is allowable for the pressure to be encountered, since the efficiency of a motor is decreased with an increase in the gap between its rotor and its field coil. Also, as noted before, the housing 5 must be constructed of non-magnetic material in order to permit the magnetic field to permeate therethrough and act on the rotor 8. The laminated core of the field coil 7 may be brought into contact with the housing 5.

A retaining plate 18 may be attached to the upper end of the tubular casing 5 by cap screws 15 or other suitable means such that it may be made removable. The rotor 8 is thus held in place between the lower end of the chamber 1 and the retaining plate 18, and by providing the top cover 2 and the retaining plate 18 removable, the impeller-like rotor may be easily inserted or removed.

Figure 2 of the drawing, shows a plan view through the chamber 1 and a top view of the rotor and impeller blades and other parts, all of which are numbered to correspond with the markings given in Figure 1. The rotor 8 is indicated to have six impeller blades 11, however, any desired number of blades may be provided when constructing the rotor 8.

A round bottom mixing chamber 1 has been indicated in the drawing, but of course, other forms of the chamber may be employed, such as one having a flat bottom or a semi-elliptical end.

In Figure 3 of the drawing, the fluid circulating device is provided with a volute-like chamber 20 having a removable side plate 21 and a side inlet 22 which is placed within the plate 21. Suitable plates or cap screws 23 may be used to attach the plate 21 to the circulating chamber 20. A tubular casing or housing 24 projects centrally into the interior of the volute-shaped chamber 20 and provides a pocket 25. Within the pocket 25, a stator 26 for an induction motor may be positioned, and within the mixing chamber 20 a ring-shaped rotor 27 is provided which is capable of rotating around the tubular casing 24 and the internally placed stator 26. Suitable bearings 28 and 29 are attached to the rotor 27 at each end thereof, so that the rotor may properly revolve within the chamber around the fixed tubular and shaft-like housing 24. A suitable plate or bar-like member 30 may be provided across the inlet opening 22 within and attached to the removable side plate 21. This member 30 will function as a retaining bar or a stop for the rotor 27; thus, as the rotor 27 revolves within the chamber 20 the rotor 27 is held in position by the wall of the chamber and the retaining plate 30. Wires 31, 32, and 33 are provided to conduct electrical energy to the stator 26. The impeller-like blades 34 may be made an integral part of the rotor or attached to the rotor 27, so that fluid circulation is accomplished when the stator 26 is electrically charged and the rotor 27 caused to rotate within the chamber 20.

Figure 4 of the drawing shows an internal view of the device as indicated by the section line 4—4 of Figure 3 and the positioning of the outlet nozzle 35 by which fluid may be discharged from the chamber 20. The rotor, blades, and other parts indicated are marked to correspond with the markings given in Figure 3 of the drawing. As in Figure 2 of the drawing the rotor 27 is shown to have six impeller blades, however, any desired number may be used in the construction of varying forms of the device.

In any form of the apparatus whether that of a mixing chamber as in Figure 1 or that of a centrifugal type pump, as in Figure 3, the fluid material within the enclosed pressure tight chamber is centrifugally circulated when the stator of the induction motor is electrically charged and the impeller-like rotor is electro-magnetically caused to rotate. Lubrication for the rotor as it revolves on the tubular housing will be provided by the fluid material within the chamber. Of course, roller or ball bearings may be used at each end of the rotor to provide improved rotating means between the rotor and the fixed housing, and other mechanical improvements or elaborations of this type may be incorporated. However, the simplified forms shown are illustrative of this invention which provides means for fluid circulation by the novel use of an impeller like rotor of an induction motor, and in a manner unaffected by pressure conditions which may be encountered.

I claim as my invention:

1. A fluid circulating device comprising a chamber having a fluid inlet and outlet, a non-magnetic housing projecting inwardly from a wall of said chamber, a stator and field coil positioned within said housing, an annular rotor within said chamber and surrounding said inwardly projecting housing, radial impeller blades affixed to said rotor and directly rotatable therewith, bearing surfaces at the opposite ends of said rotor and said housing, and a retaining plate removably attached to the end of said housing within said chamber for holding said rotor in place.

2. A fluid mixer comprising a vertical mixing chamber having a fluid inlet and outlet, a non-magnetic cylindrical housing projecting upwardly from the bottom of said chamber, a cylindrical stator and field coil positioned within said housing, an annular rotor surrounding said housing within said chamber, radial impeller blades affixed to said rotor and directly rotatable therewith, bearing surfaces at the opposite ends of said rotor and said housing, and a retaining plate removably attached to the end of said housing within said chamber for holding said rotor in place.

3. A centrifugal pump comprising a volute pumping chamber having a centrally located fluid inlet in a side wall thereof and a tangential fluid outlet, a non-magnetic cylindrical housing projecting inwardly from a side wall of said chamber opposite said inlet, a cylindrical stator and field coil positioned within said housing, an annular rotor surrounding said housing within said chamber, and radial impeller blades affixed to said rotor and directly rotatable therewith.

4. A centrifugal pump comprising a volute pumping chamber having a centrally located fluid inlet in a side wall thereof and a tangential fluid outlet, a non-magnetic cylindrical housing projecting inwardly from a side wall of said chamber opposite said inlet, a cylindrical stator and field coil positioned within said housing, an annular rotor surrounding said housing within said chamber, radial impeller blades affixed to said rotor and directly rotatable therewith, bearing surfaces at the opposite ends of said rotor and said housing, and a retaining plate removably attached to the end of said housing within said chamber for holding said rotor in place.

GEORGE L. HERVERT.

REFERENCES CITED

The following references are of record in the file of this patent:

UNITED STATES PATENTS

| Number | Name | Date |
|---|---|---|
| 591,395 | Fay | Oct. 12, 1897 |
| 1,233,569 | Graemiger | July 17, 1917 |
| 1,632,357 | White | June 14, 1927 |
| 1,930,948 | Brewer | Oct. 17, 1933 |
| 2,366,562 | Schug | Jan. 2, 1945 |